United States Patent
Wang et al.

(10) Patent No.: US 8,621,255 B2
(45) Date of Patent: Dec. 31, 2013

(54) SYSTEM AND METHOD FOR LOOP TIMING UPDATE OF ENERGY EFFICIENT PHYSICAL LAYER DEVICES USING SUBSET COMMUNICATION TECHNIQUES

(75) Inventors: Peiqing Wang, Irvine, CA (US); Linghsiao Wang, Irvine, CA (US); Mehmet Tazebay, Irvine, CA (US); Scott Powell, Alisa Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 947 days.

(21) Appl. No.: 12/749,405

(22) Filed: Mar. 29, 2010

(65) Prior Publication Data

US 2011/0202781 A1     Aug. 18, 2011

Related U.S. Application Data

(60) Provisional application No. 61/305,781, filed on Feb. 18, 2010.

(51) Int. Cl.
| | |
|---|---|
| G06F 1/00 | (2006.01) |
| G06F 1/26 | (2006.01) |
| G06F 1/32 | (2006.01) |
| H04L 7/00 | (2006.01) |
| G11B 20/20 | (2006.01) |

(52) U.S. Cl.
USPC ........... 713/323; 713/300; 713/320; 375/354; 714/700

(58) Field of Classification Search
None
See application file for complete search history.

(56) References Cited

U.S. PATENT DOCUMENTS

| | | | |
|---|---|---|---|
| 2003/0144020 A1* | 7/2003 | Challa et al. | 455/522 |
| 2006/0128308 A1* | 6/2006 | Michael et al. | 455/41.2 |
| 2006/0291602 A1 | 12/2006 | Ran | |
| 2007/0150762 A1* | 6/2007 | Sharma et al. | 713/300 |
| 2008/0225841 A1 | 9/2008 | Conway et al. | |
| 2008/0304519 A1* | 12/2008 | Koenen et al. | 370/477 |
| 2009/0149127 A1* | 6/2009 | Viitamaki et al. | 455/41.2 |

* cited by examiner

Primary Examiner — Ji H Bae
(74) Attorney, Agent, or Firm — Duane S. Kobayashi

(57) ABSTRACT

A system and method for loop timing update of energy efficient physical layer devices using subset communication techniques. During a quiet period during which a subset of communication channels are transitioned from an active mode to a low-power mode, circuitry in the active channel can be designed to track, on behalf of the inactive channels, the phase drift due to the frequency offset. This tracking of the frequency estimation error would reduce the time required to perform a timing update for the communication channels when transitioning back to the active mode.

18 Claims, 5 Drawing Sheets

SYSTEM AND METHOD FOR LOOP TIMING UPDATE OF ENERGY EFFICIENT PHYSICAL LAYER DEVICES USING SUBSET COMMUNICATION TECHNIQUES

This application claims priority to provisional application Ser. No. 61/305,781, filed Feb. 18, 2010, which is incorporated by reference herein, in its entirety, for all purposes.

BACKGROUND

1. Field of the Invention

The present invention relates generally to energy efficient Ethernet (EEE) and, more particularly, to a system and method for loop timing update of energy efficient physical layer devices using subset communication techniques.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

Energy-savings requirements are rapidly being mandated for a variety of wireline and wireless applications. Here, energy-savings initiatives have identified the need for energy efficiency of physical layer devices (PHYs). In one example, energy efficiency of PHYs can be produced by enabling the PHYs to enter into a low-power mode during which there is no data, video and/or audio data for transmission.

In designing an energy efficient solution, one of the considerations is the utilization of the network link. For example, many network links are typically in an idle state between sporadic bursts of data, while in other network links, there can be regular or intermittent low-bandwidth traffic, with bursts of high-bandwidth traffic. Conventionally, an EEE control policy can analyze the link utilization to determine whether to adapt the link, link rate, and layers above the link to an optimal solution based on various energy costs and impact on traffic.

In effecting a proper EEE control policy, one of the significant factors is the ability to which an energy-efficient PHY can wake up quickly and reliably when the higher layers of the network detect and request traffic exchange. This transition time can greatly impact the aggressiveness of the EEE control policy in its attempt to realize energy savings within the PHY. Moreover, this transition time can impact the amount of buffering that may need to be allocated in ensuring that traffic is not lost. What is needed therefore is a mechanism that improves the ability of the PHY to wake up quickly and reliably from a low-power mode.

SUMMARY

A system and/or method for loop timing update of energy efficient physical layer devices using subset communication techniques, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy Efficient Ethernet (EEE) networks attempt to save power when the traffic utilization of the network is not at its maximum capacity. This serves to minimize the performance impact while maximizing energy savings. At a broad level, the EEE control policy for a particular link in the network determines when to enter an energy saving state, what energy saving state (i.e., level of energy savings) to enter, how long to remain in that energy saving state, what energy saving state to transition to out of the previous energy saving state, etc. Conventional EEE control policies can base these decisions on a combination of static settings established by an IT manager and the properties of the traffic on the link itself.

Figure 1:
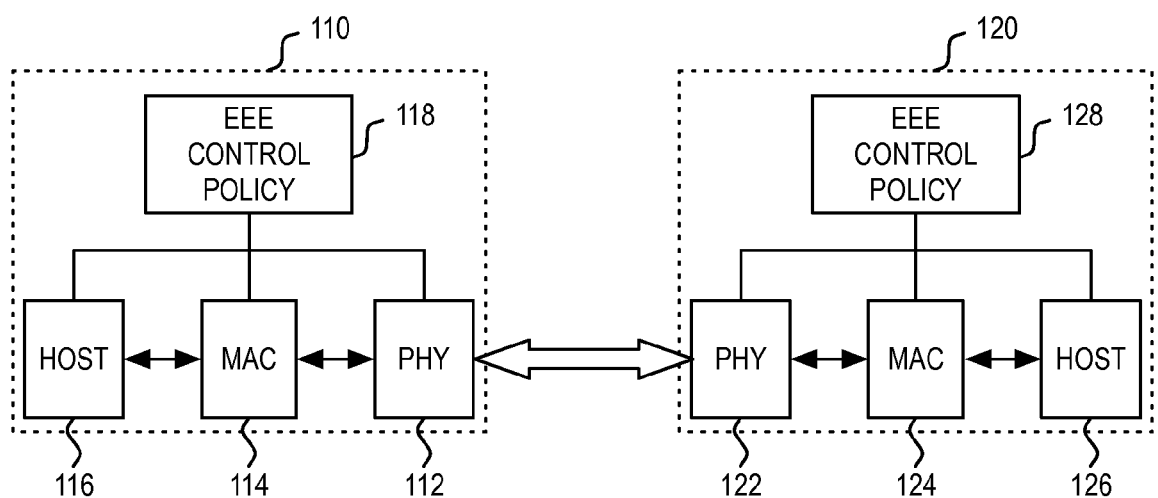
FIG. 1 illustrates an Ethernet link between a local and remote link partner.

FIG. 1 illustrates an example link to which an EEE control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As would be appreciated, the link can operate at standard or non-standard (e.g., 2.5 G, 5 G, 10 G, etc.) link rates, as well as future link rates (e.g., 40 G, 100 G, etc.). The link can also be supported by various port types (e.g., backplane, twisted pair, optical, etc.) and in various applications (e.g., Broadreach Ethernet, EPON, etc.).

As FIG. 1 illustrates, link partners 110 and 120 include EEE control policy entities 118 and 128, respectively. In general, EEE control policy entities 118 and 128 can be designed to determine when to enter an energy saving state, what energy saving state (i.e., level of energy savings) to enter, how long to remain in that energy saving state, what energy saving state to transition to out of the previous energy saving state, etc. EEE control policy entities 118 and 128 can comprise suitable logic, circuitry, and/or code that may be enabled to establish and/or implement an EEE control policy for the network in which the link resides. In various embodiments, EEE control policy entities 118 and 128 can be a logical and/or functional block which may, for example, be implemented in one or more layers, including portions of the PHY or enhanced PHY, MAC, switch, controller, or other subsystems in the host.

As illustrated, link partner 110 includes physical layer device (PHY) 112, media access control (MAC) 114, and host 116, while link partner 120 includes PHY 122, MAC 124, and host 126. In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MAC controllers 114 and 124 may provide the necessary services to hosts 116 and 126 to ensure that packets are suitably formatted and communicated to PHYs 112 and 122. MAC controllers 114 and 124 may comprise suitable logic, circuitry, and/or code that may enable handling of data link layer (Layer 2) operability and/or functionality. MAC controllers 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

In general, controlling the data rate of the link may enable link partners 110 and 120 to communicate in a more energy efficient manner. More specifically, a reduction in link rate to a sub-rate of the main rate enables a reduction in power, thereby leading to energy savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1G PHY can be created from a parent 10GBASE-T PHY by a process that turns off three of the four lanes/channels.

Figure 2:
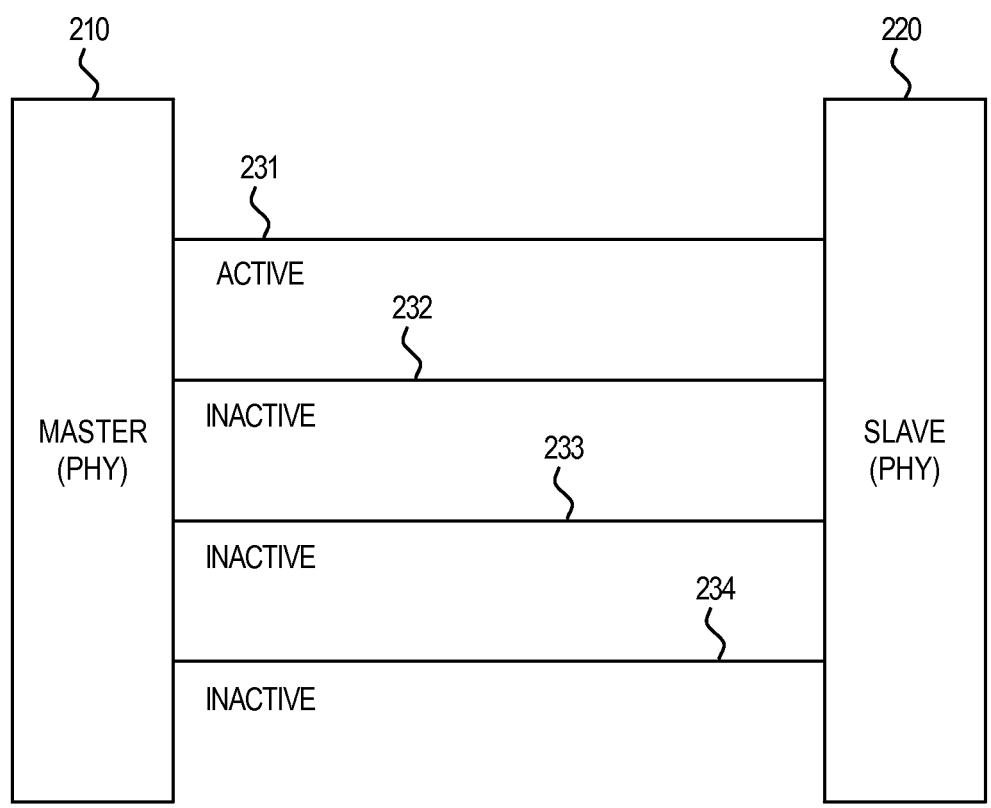
FIG. 2 illustrates a plurality of channels between a local and remote link partner.

FIG. 2 illustrates an example of a multi-lane/multi-channel system, which includes four communication channels 231-234 between master PHY 210 and slave PHY 220. The status of a PHY as either a master PHY or a slave PHY is determined during an auto-negotiation process that takes place prior to establishment of the transmission link. Once established, master PHY 210 transmits at a fixed frequency determined by an oscillator and runs its receiver at the exact same frequency. Slave PHY 220 then recovers the clock from the signal received from master PHY 210 and uses the recovered clock to determine the timing of its receiver and transmitter operations.

In this timing loop configuration, slave PHY 220 is designed to transmit its data at the exact same rate at which master PHY 210 is transmitting its data. For a system such as 1000BASE-T, the nominal transmission rate of the master PHY is 125 MHz. In real-world applications, however, the master PHY's transmission rate will vary by some small amount ($\epsilon$) due to oscillator variations resulting from various factors such as temperature. In a master-slave configuration, the slave PHY is responsible for determining the frequency variation from the incoming received signal using a timing recovery algorithm. Once the frequency variation is determined, the slave PHY can then transmit to the master PHY at 125 MHz$\pm\epsilon$.

In the multi-lane/multi-channel system illustrated in FIG. 2, a partial energy savings can be attained by partially powering down the communication circuitry. In an example subset PHY technique, circuitry associated with one or more of the lanes/channels can be partially or fully powered down when the remote PHY is transmitting idle sequences. For example, circuitry associated with channel 231 can remain in an active state, while circuitry associated with channels 232-234 can be placed in an inactive state.

This inactive state of channels 232-234 would reduce the effective data throughput of the system to achieve energy savings that are in proportion to the link utilization. A PHY connected to a link with low average utilization would therefore have lower average power dissipation when using these energy efficiency techniques.

Maintaining synchronization is one of the key elements in an energy-efficient application such as a subset PHY technique. As noted, where loop timing is utilized between the master PHY and the slave PHY, the slave PHY needs to recover the master clock and keep track of any frequency offset to maintain the loop timing. This tracking dictates that the master PHY would only need to acquire its optimal sampling phase to align with the slave PHY's recovered clock. The slave PHY therefore plays a key role in maintaining the loop timing.

In an EEE application, the PHY can alternate between an active mode and a low-power (or sleep) mode under the direction of an EEE control policy. The transition from a low-power mode back to an active mode is a key transition due to the appearance of traffic for transmission on the link, which necessitates the wake-up of the PHY from the low-power mode.

During the wake-up process, the slave PHY updates its timing loop, re-acquires the scrambler state and physical coding sublayer (PCS) alignment within a very short time before it initiates the full-duplex training for both the master and slave PHYs. These procedures have to be successfully executed before both transceivers are declared ready for data transmission. If the slave PHY cannot re-acquire its timing in a very short time, then the system may not be able to meet the required wake-up time, which can cause data transmission failure.

In accordance with the present invention a synchronization technique is provided for energy-efficient subset PHYs that increases the robustness of the wake-up process that transitions the system to an active mode. As will be described in greater detail below, the principles of the present invention enable a subset PHY technique that can provide more accurate channel and timing synchronization during the low-power mode.

In conventional energy-efficient loop-timed transceivers, when both the master and slave PHYs power down their local transmitters and receivers, then there will be no idle signals available for the slave PHY to keep track of the frequency offset. While this energy-efficient technique achieves maximum power savings in the master and slave PHYs, the robustness in the wake-up process suffers.

More specifically, the lack of idle signals available to the slave PHY will prevent the slave PHY from tracking the frequency estimation error. A failure to account for the frequency estimation error will consequently introduce a phase drift over a long quiet period when both the master and slave PHYs are in a low-power mode. This phase drift of the slave PHY's recovered clock will cause a decision-point signal-to-noise-ratio (dp-SNR) degradation, which can affect the timing update during the wake-up process. More generally, it can cause instability for the timing recovery algorithm and/or require much more time for the equalizers to adapt to the phase drift. This additional time needed for the transition to the active mode has significant impact on the EEE control policy in its attempt to realize energy savings with the PHY.

In general, the optimal phase for a receiver can be expressed as $\phi_{opt}=\phi(n)+\Delta f \cdot t$, where $\phi(n)$ is the phase offset and $\Delta f$ is the frequency offset. As this expression illustrates, a failure to account for the frequency offset will cause an increasing error over time. This increasing error gives rise to the phase drift over a long quiet period, which can increase the amount of time needed to recover the optimal phase.

In a subset PHY technique where one or more lanes/channels stay active, the timing updates for those one or more active lanes/channels can be maintained to keep track of the channel variations and frequency drift of the active channel (s). In comparison, the inactive channels cannot maintain the timing updates. This subjects those inactive channels to noisy and possibly insufficient frequency estimates during the wake-up process and hence makes the robustness of the overall system vulnerable to the phase drift due to the frequency offset.

Figure 3:
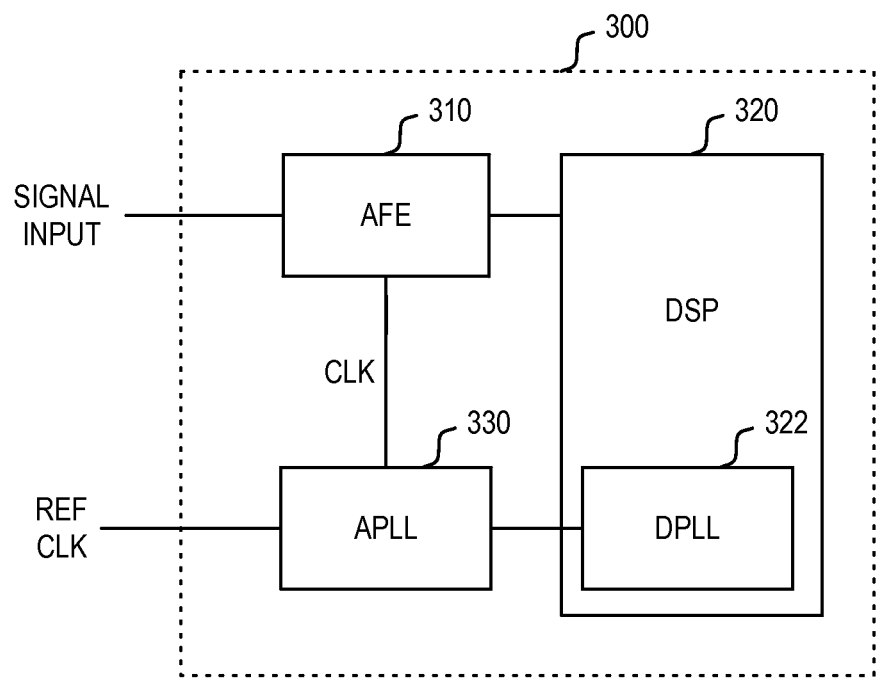
FIG. 3 illustrates an embodiment of a timing recovery loop.

The present invention addresses this problem while being independent of the particular subset PHY architecture used. FIG. 3 illustrates an embodiment of a receiver according to the present invention.

As illustrated, receiver 300 includes analog front end (AFE) 310 that receives a signal input. AFE 310 is generally designed to perform an analog-digital sampling of the signal input based on a clock that is aligned for optimal sampling. The digitized analog signal is then passed to DSP 320 for crosstalk cancellation, channel equalization and timing recovery. Here, it should be noted that for simplicity, the AFE and digital phase locked loop (DPLL) for only a single channel are shown in FIG. 3. The recovered symbols along with the estimation error produced by a soft-decision process are provided to DPLL module 322 within DSP 320 for decision-directed timing recovery. In general, DPLL 322 is responsible for estimating the frequency offset and the phase offset for the optimal sampling phase for a channel's signal input.

In accordance with the present invention, APLL 330 is in common to all of the channels. An advantage of such a configuration is that the available timing information from DPLL 322 in the active channel can be used to compute an accurate frequency estimation reference for the remaining inactive channels in the subset PHY. Here, the frequency estimation accuracy is obtained by long-term averaging the frequency offset from the integral loop of DPLL 322 for the active channel of the subset PHY. This frequency offset from the integral loop of DPLL 322 for the active channel would replace the integral loop values of the DPLLs for the other inactive channels, which do not update their timing loop during a quiet period. For example, in one embodiment, the frequency estimate information from the DPLL for the active channel is selectively provided to the integral loops of the DPLLs for the inactive channels via multiplexer control. When the inactive channel returns to an active state, the multiplexer control can return to using the frequency estimate information from the integral loops of the DPLLs of the now active channels. Significantly, the replacement of noisy estimates with the accurate frequency estimation values from the active channel minimizes the phase drift due to the frequency estimation errors in the integral loops of DPLLs in the inactive channels.

Figure 4:
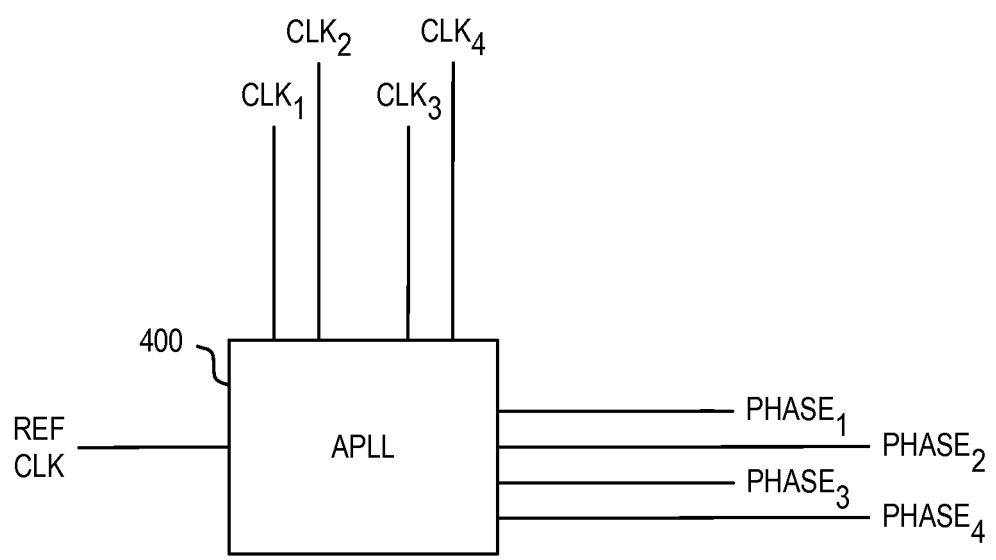
FIG. 4 illustrates an embodiment of a clock generator in a timing recovery loop.

FIG. 4 illustrates the function of APLL 400, which is in common to multiple channels such as channels 1-4. In this example, channel 1 is designated as an active channel, while channels 2-4 are designated as inactive channels. As illustrated, APLL 400 is designed to produce four sampling clocks ($CLK_1$-$CLK_4$) for the four channels based on a single reference clock. The particular phase of the four sampling clocks is determined using four phase control signals ($PHASE_1$-$PHASE_4$). Each of the four phase control signals ($PHASE_1$-$PHASE_4$) are produced by respective DPLLs. For example, phase control signal $PHASE_1$ is generated by the DPLL for channel 1, while phase control signal $PHASE_2$ is generated by the DPLL for channel 2, etc. In one embodiment, the phase control signals $PHASE_1$-$PHASE_4$ enable the APLL to shift the reference clock by fixed phase steps. This phase shifting by fixed phase steps can enable the APLL to produce an average frequency that matches the incoming clock.

During a quiet period, channel 1 remains active, while channels 2-4 are inactive. For channel 1, the DPLL will continually produce a phase control signal $PHASE_1$ based on its own frequency estimates. During the quiet period, channels 2-4 enter an inactive state and are not actively processing signal inputs at their respective AFEs. During this time, the DPLLs for inactive channels 2-4 would continue to operate, by replacing the frequency estimate information in their integral loops with the frequency estimate information from the integral loop of the DPLL of active channel 1. Significantly, the provision of the frequency estimate information by the DPLL in active channel 1 to the DPLLs of inactive channels 2-4 enables the DPLLs of the inactive channels to track the long-term averaging phase component of $\Delta f \cdot t$ for inactive channels 2-4. The optimal sampling phase for the clocks for inactive channels 2-4 would therefore require only an identification of the phase offsets by the DPLLs in the inactive channels during the wakeup process.

Significantly, as the DPLL of active channel 1 tracks the phase drift due to the frequency offset on behalf of the inactive channels, the time required to identify the missing phase offset component is relatively low as compared to identifying both the frequency offset and phase offset components. This lowered optimal-phase acquisition time increases the probability of a robust wake-up process.

Figure 5:
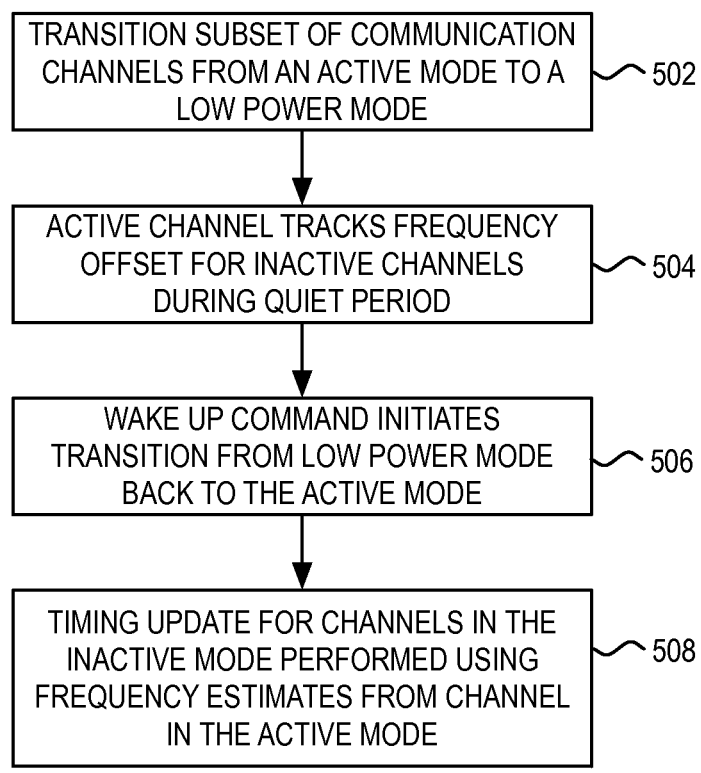
FIG. 5 illustrates a flowchart of a process of the present invention.

To further illustrate the features of the present invention, reference is now made to the flowchart of FIG. 5, which illustrates a loop-timing update process. As illustrated, the process begins at step 502 where a subset of communication channels are transitioned from an active mode to a low-power mode. As noted, the principles of the present invention are not dependent on the particular subset PHY technique, which can also be dependent on the link rate. In the process of step 502, any subset of the number of communication channels can be transitioned to a low-power mode. For example, where four channels exist, one, two, or three of those four channels can be transitioned to a low-power mode.

At step 504, the one or more remaining active channels are then designed to track the frequency offset on behalf of the inactive channels during a quiet period. Through long-term averaging, the tracked frequency offset during the quiet period can be used to identify the phase-drift contribution attributable to the frequency offset. In one embodiment, the phase-drift contribution attributable to the frequency offset can be identified using frequency estimate information from the integral loop of the DPLL of an active channel in the integral loop of the DPLL for an inactive channel. As would be appreciated, the specific signaling mechanism by which the frequency estimate information is provided to the integral loop of the DPLL of an inactive channel would be implementation dependent.

At some point during the quiet period, a wake-up command would be generated by the EEE control policy. At step 506, this wake-up command would initiate a transition by the circuitry associated with the inactive channels to transition from the low-power mode back to the active mode. At step 508, the timing update for the communication channels in the inactive mode would be performed. In this process, the phase offset would be identified as the DPLL of the inactive channel has already incorporated the frequency adjustments based on the frequency estimations generated by the DPLL of the active channel. Significantly, this process would eliminate the need to estimate the frequency offset portion of the optimal phase determination in the wakeup process. Determination of the phase offset would then be accomplished in a relatively short amount of time, thereby decreasing the time to fully transition to the active mode.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficient Ethernet method in a device that supports a plurality of channels, comprising:
transitioning by said device from an active mode to a low power mode, said device including a plurality of receivers that are respectively associated with said plurality of channels, and a plurality of timing loops respectively supporting said plurality of channels, said low power mode having each receiver of a first subset of said plurality of channels in a low power state;
tracking a frequency estimation error of a clock recovered from a signal received by a receiver that supports one of a second subset of said plurality of channels, the second subset of said plurality of channels remaining in an active state during said low power mode of said device; and
applying said frequency estimation error to each timing loop that supports said first subset of said plurality of channels during a quiet period during which each receiver of said first subset of said plurality of channels is in said low power state, wherein said application of said frequency estimation error enables each timing loop that supports said first subset of said plurality of channels to track a phase drift during said quiet period.

2. The method of claim 1, wherein said transitioning comprises transitioning to a subset physical layer device mode.

3. The method of claim 1, wherein said transitioning comprises transitioning to a low power idle mode.

4. The method of claim 1, wherein said transitioning comprises transitioning all but one of said plurality of channels to said low power state.

5. The method of claim 1, wherein said tracking comprises tracking via a digital phase locked loop.

6. The method of claim 1, wherein said applying comprises applying said frequency estimation error to a plurality of timing loops.

7. The method of claim 6, wherein said applying comprises applying said frequency estimation error to a plurality of independent timing loops.

8. The method of claim 1, wherein said applying comprises applying said frequency estimation error to an integral portion of a digital phase locked loop.

9. An energy efficient Ethernet method for tracking a phase drift in a device, the device including a plurality of receivers that are respectively associated with a plurality of channels, comprising:
after a first of said plurality of channels has transitioned to a low power state from an active state, tracking a frequency estimation error by a receiver associated with a second of said plurality of channels that remains active in said active state during a quiet period when said first of said plurality of channels remains in said low power state;
during said quiet period, applying said frequency estimation error to a timing loop of said first of said plurality of channels; and
transitioning said first of said plurality of channels from said low power state back to said active state using said timing loop to which said frequency estimation error has been applied.

10. The method of claim 9, wherein said tracking comprises tracking via a digital phase locked loop.

11. The method of claim 9, wherein said tracking comprises tracking by only said second of said plurality of channels.

12. The method of claim 9, wherein said applying comprises applying said frequency estimation error to a plurality of timing loops.

13. The method of claim 12, wherein said applying comprises applying said frequency estimation error to a plurality of independent timing loops.

14. The method of claim 9, wherein said applying comprises applying said frequency estimation error to an integral portion of a digital phase locked loop.

15. An energy efficient Ethernet device that supports both an active mode and a low power mode, comprising:
a plurality of receivers that are respectively associated with a plurality of channels, wherein during said low power mode each receiver of a first subset of said plurality of channels is in a low power state;
a first timing recovery loop associated with a first receiver that supports one of a second subset of said plurality of channels that remains active during said low power mode of said energy efficient Ethernet device, said first timing recovery loop tracking a frequency estimation error; and
a second timing recovery loop associated with a second receiver that supports one of said first subset of said plurality of channels, said second timing recovery loop receiving said frequency estimation error that is tracked by said first timing recovery loop, thereby enabling said second timing recovery loop to compensate for a phase drift while said second receiver is in said low power state.

16. The device of claim 15, wherein said first timing recovery loop and said second timing recovery loop are independent.

17. The device of claim 15, wherein said first timing recovery loop and said second timing recovery loop include a common clock generator.

18. The device of claim 17, wherein said common clock generator is an analog phase locked loop that generates a clock for said plurality of said channels.

* * * * *

UNITED STATES PATENT AND TRADEMARK OFFICE
CERTIFICATE OF CORRECTION

| | | |
|---|---|---|
| PATENT NO. | : 8,621,255 B2 | Page 1 of 1 |
| APPLICATION NO. | : 12/749405 | |
| DATED | : December 31, 2013 | |
| INVENTOR(S) | : Wang et al. | |

It is certified that error appears in the above-identified patent and that said Letters Patent is hereby corrected as shown below:

In the Claims

Col. 8, line 8, delete "active".

Signed and Sealed this
Fourth Day of March, 2014

Michelle K. Lee
*Deputy Director of the United States Patent and Trademark Office*